United States Patent Office 2,764,558
Patented Sept. 25, 1956

2,764,558

SILICA-ZIRCONIA CATALYST OF SUPERIOR REGENERABILITY

Llewellyn Heard, Hammond, Ind., and Glenn M. Webb, Western Springs, Ill., assignors to Standard Oil Company, Chicago, Ill., a corporation of Indiana No Drawing. Application October 31, 1951,
Serial No. 254,198

3 Claims. (Cl. 252—454)

This invention relates to the catalytic conversion of hydrocarbons. More particularly, it relates to hydrocarbon-conversion catalysts, and to an improved silica-zirconia catalyst which has the property of improving in regenerability during use.

Silica-zirconia catalysts have been prepared, studied, and described in the prior art, as exemplified by Connolly, U. S. Patent 2,366,491 (January 2, 1945) and Marisic et al., U. S. Patent 2,442,772 (June 8, 1948). These catalysts have been found to be useful in various hydrocarbon-conversion processes, especially in the cracking of gas oils to produce gasoline of high octane number.

We have now discovered a new technique whereby silica-zirconia catalysts can be prepared having not only high catalytic activity and selectivity, but superior regeneration characteristics as well. Briefly, we have discovered that an improved silica-zirconia catalyst can be prepared by contacting a mixture of hydrous silica gel and hydrous zirconia with a volatile, water-miscible, liquid organic oxygenated compound such as ethanol or acetone, thus displacing most of the water therefrom, and thereafter drying and calcining the treated mass according to recognized procedures. When the resulting catalytic mixture is employed in the conversion of hydrocarbons, the carbon deposited thereon is readily removed by burning according to conventional regeneration techniques, and moreover the catalyst exhibits the unique property of improving in regenerability with use. Our new catalyst is the first catalyst to our knowledge which improves in regeneration rate during use.

We are not certain as to the manner in which our new process effectuates the observed improvement in silica-zirconia catalysts. It is possible, for example, that the organic solvent functions as a spacing agent, imparting a desirable structure to the wet hydrogel which remains after the solvent has been removed. Alternatively, the solvent may function simply as a dehydrating agent, setting the hydrogel in a more porous condition or with pores of larger side, and avoiding shrinkage which ordinarily occurs when hydrogels are dried simply by driving off the water. Whatever the explanation may be, our experimental results demonstrate that greatly improved catalysts can be made by our new procedure.

One object of our invention is to improve the conversion of hydrocarbons. Another object is to prepare an improved catalyst for the conversion of hydrocarbons. A further object is to improve the physical and chemical characteristics of silica-zirconia catalysts. A specific object is to improve the regeneration characteristics of silica-zirconia catalysts. Other objects of our invention and its advantages over the prior art will be apparent from the following description and claims.

The preparation of a catalyst according to our new technique broadly involves the steps of preparing a mixture of hydrous silica gel and hydrous zirconia, steeping, soaking, or extracting the resulting mixture in a volatile hydrophilic organic liquid, and drying and calcining the resulting organogel.

In one specific embodiment of our invention, a silica-zirconia catalyst of excellent properties is prepared by (1) reducing the pH of water glass with nitric acid, thereby obtaining a silica hydrosol, (2) adding aqueous zirconyl nitrate, thereby obtaining a mixed silica-zirconia hydrosol, (3) allowing the mixed hydrosol to set to a hydrogel, (4) allowing the hydrogel to dry in air to the appearance of surface crystals, (5) water-washing the hydrogel substantially free of water-soluble substances, (6) immersing in aqueous 95 percent ethanol, (7) drying, and (8) calcining.

Numerous methods are known for preparing the mixture of hydrous silica gel and hydrous zirconia required in our invention. For example, silica hydrogel can be commingled with zirconia hydrogel; or silica hydrosol can be commingled with zirconia hydrosol, and the mixed hydrosols allowed to cogel. By "hydrosol" is meant a fluid, transparent or nearly transparent aqueous suspension of hydrous oxide. By "hydrogel" is meant any hydrous gelatinous solid containing water and hydrous oxide. Alternatively, hydrous zirconia, by which is meant zirconia containing a quantity of imbibed water, can be mixed with silica hydrogel, or gelled with silica hydrosol. Numerous other alternatives will be apparent to those skilled in the art.

Silica hydrosols are conveniently prepared by adding acid to an aqueous water-glass solution, preferably but not necessarily to a pH below about 7, or by treatment of an aqueous water-glass solution with a cation-exchange resin. Silica hydrosols of low pH (below about pH 2) can be converted to hydrogels by the addition of a zirconia hydrosol, or by a solution of a zirconium salt or other electrolyte. Silica hydrosols of higher pH (between about 2 and 7) ordinarily set to a hydrogel in a few seconds or minutes, depending on the concentration, the pH level, and the temperature, without the addition of other substances.

Zirconia hydrosols can be prepared by precipitating a zirconium salt solution with ammonium hydroxide to produce a hydrous oxide of zirconium, washing the oxide free from salts, and dissolving the washed oxide in the minimum amount of a weak organic acid such as formic acid or acetic acid. This procedure results in a stable hydrosol (possibly zirconic acid) similar to silicic acid hydrosols, which can be set to a zirconia hydrogel by evaporation or by other means known in the art. Other methods for preparing hydrous zirconia are described in Marisic et al. U. S. Patent 2,442,772 (June 8, 1948) and elsewhere in the prior art.

The mixture of hydrous silica and hydrous zirconia employed in our process should be substantially freed from salts and any other water-soluble constituents by careful washing of the mixture itself or of the component oxides before admixture thereof. The hydrous silica-zirconia mixture is then optionally dried until crystals begin to form on the surface thereof. Thereafter, it is immersed in, or otherwise contacted with, a volatile, water-miscible, liquid organic oxygenated compound for a sufficient period of time to remove most or substantially all of the water present in the mixture. For this purpose, a contact time of about 0.5 to 2 days is ordinarily sufficient, and we prefer to employ ordinary or slightly elevated temperatures, for example around 20 to 60° C., and autogenous pressures. The contacting can conveniently be done by slurrying the gel in the chosen organic liquid, by percolating the liquid through the gel, by extracting the gel in apparatus functioning in the manner of a Soxhlet extractor, or by other means well known in the art.

The class of volatile water-miscible, liquid organic oxygenated compounds employed in our process includes acetone, acetaldehyde, and the lower aliphatic alcohols, such as methanol, ethanol, isopropyl alcohol, and n-propyl alcohol, and the like. By "volatile" liquids is meant liquids having a boiling point not greatly higher than the boiling point of water. By "water-miscible" is meant miscible with water in all proportions under the conditions of temperature and pressure employed in the immersion step.

The treated catalytic mixture is completed according to conventional methods by drying at a temperature between about 200 and 400° F. for a period between about 4 and 24 hours and/or by calcining at a temperature between about 800 and 1200° F. for around 2 to 8 hours or more. The catalyst can be prepared in any desired mechanical form according to the specific purpose for which it is intended. Either before or after calcination it can be broken into lumps or granules, or it can be ground to a fine powder adapted for use in the suspensoid or fluidized-solids processes. Alternatively, the catalyst can be formed into pills, pellets, or other suitable shapes, preferably prior to the calcination step. In this case, the catalytic mixture is partially dried, ground to a powder preferably smaller than 30 mesh, combined with a suitable lubricant such as graphite, hydrogenated coconut oil, stearic acid, rosin, or the like, and shaped by extrusion, molding, or by other means known in the art. Pills having dimensions ranging from about 1/8" x 1/8" to 1/2" x 1/2" are generally satisfactory. The shaped masses can then be further dried and/or calcined as set forth above.

Our improved silica-zirconia catalyst should preferably contain zirconia in the proportion of about 5 to 20 percent by weight, optimally 10 to 15 percent.

The following specific example will more clearly illustrate our invention:

Example

"N-Brand" water glass (435 grams, containing 125 grams of $SiO_2$) was diluted with water to a total volume of 1.563 liters, and the pH of the resulting solution was adjusted to 10.2 by adding 227 milliliters of aqueous 17.5 percent nitric acid. To the resulting silica hydrosol was added with stirring 0.22 liter of aqueous zirconyl nitrate solution, containing 168 grams of $ZrO(NO_3)_2 \cdot 2H_2O$ per liter, equivalent to 7.75 grams of $ZrO_2$ per 100 milliliters. The mixture set to a transparent hydrogel after standing ten minutes.

The hydrogel was then allowed to dehydrate at room temperature until about 50 percent of its water had been lost, at which time salt crystals (pogonotrophy) began to appear on its surface. The hydrogel was thereupon immersed in water, and was washed repeatedly with water until substantially free from water-soluble components. The washed gel was immersed for 24 hours in aqueous 95 percent ethanol, most of the water being removed from the gel in this way. The resulting alcogel was dried at 185° F. for 18 hours and calcined in air at 1000° F. for four hours. The completed catalyst contained 12 percent $ZrO_2$ by weight. It will be referred to hereinafter as "Si-Zr Alcogel" catalyst.

For comparison, a catalyst was prepared according to the same procedure, except that the alcohol-immersion step was omitted. The completed catalyst, likewise containing 12 percent $ZrO_2$ by weight, will be referred to hereinafter as "Si-Zr Hydrogel" catalyst.

The completed catalysts were tested to measure their activity and selectivity in the cracking of a gas oil, the test methods of Shankland and Schmitkons ("Determination of Activity and Selectivity of Cracking Catalyst," Proceedings of the American Petroleum Institute, Twenty-Seventh Annual Meeting (1947), volume 27 (III), pages 57–77) being used for this purpose.

The resulting carbon-coated catalysts were thereafter tested to determine their carbon-burning rates, as a measure of their regenerability. The tests were conducted on one-gram samples of the carbonized catalysts at 1050° F. with air as the oxygen source, and the burning rates were calculated as grams of carbon burned per 100 seconds per 100 grams of catalyst at a carbon content of one percent. For comparison, a number of well-known catalysts were similarly tested.

Further tests were carried out on the various catalysts to determine the effect of aging on their regeneration characteristics. In these tests, additional quantities of the carbonized catalysts were subjected to an accelerated aging procedure by calcination in a nitrogen atmosphere at 1300° F. for 2 hours, and their carbon-burning rates were measured as described above. These rates, it has been found, correspond closely to the carbon-burning rates of catalysts that have been used for a period of 6 to 15 months in the cracking of gas oils. The burning rates of the carbonized fresh catalysts and of the aged catalysts therefore are together a measure of the stability of the regenerability of the catalysts.

The data from the various tests on the catalysts are given in the following table:

| Catalyst | Si-Zr Alcogel | Si-Zr Hydrogel | Silica-Alumina | Silica-Magnesia | Sulfur-Resistant Clay |
| --- | --- | --- | --- | --- | --- |
| Composition, wt. percent | $12ZrO_2$ | $12ZrO_2$ | $14Al_2O_3$ | $30MgO$ | --------- |
| Surface area, m.²/g | 500 | 463 | 460 | 580 | 131 |
| Pore dia., A | 27.9 | --------- | 45 | 28 | 83 |
| Indiana activity | 77.4 | 63.2 | 143 | 82.2 | 35 |
| Carbon factor | 0.9 | 1.0 | 1.0 | 0.8 | 1.5 |
| Gas factor | 1.0 | 1.1 | 1.0 | 0.7 | 1.0 |
| Burning rate (× 100): | | | | | |
| New | 0.67 | 0.68 | 0.35 | 0.48 | 0.42 |
| Aged | 0.80 | 0.68 | 0.34 | 0.25 | 0.28 |

From the foregoing data it is apparent that our new catalyst not only has a higher activity than the prior-art silica-zirconia catalysts, but also actually improves in regenerability with use. This is in striking contrast to such catalysts as silica-magnesia and sulfur-resistant clay, which undergo a rapid and serious decline in regenerability during use.

It is to be understood that the foregoing example is illustrative only, and not intended to limit our invention in any way. In general, it can be said that any modifications or improvements that would ordinarily occur to one skilled in the art are to be considered as lying within the scope of our invention.

Our improved silica-zirconia catalyst is useful in numerous processes for converting hydrocarbon oils. It is highly effective, for example, in the cracking of petroleum oils, such as gas oils, heavy naphthas, and the like, at temperatures in the range of about 800 to 950° F. and pressures ordinarily between about 1 and 5 atmospheres, absolute. Our catalyst is also suitable for reforming gasolines to improve their antiknock rating, employing conventional operating conditions. Our new composition may further be used as a supporting material for other catalytic substances; for example, we may incorporate therein alumina, molybdena, nickel, iron, platinum, or other catalytic materials. Numerous variants will be apparent to those skilled in the art.

Our catalyst can be used to advantage in all kinds of catalytic treating units, whether of the fixed-bed, moving-bed, or fluidized type. It is especially useful in plants employing the fluidized-catalyst technique, since its unusually high rate of regenerability permits the use of regeneration vessels of substantially smaller size.

In accordance with the foregoing description, we claim as our invention:

1. A process for preparing an improved silica-zerconia catalyst which comprises preparing a mixture of hydrous silica gel and hydrous zirconia having about 5 to 20 weight percent zirconia on an anhydrous basis, partially drying the resulting mixed hydrogel to the appearance of surface crystals, freeing the partially dried mixed hydrogel from any water-soluble substances by water-washing, soaking the water-washed hydrogel in an alcohol having 1 to 3 carbon atoms per molecule for a period of time to substantially remove remaining water therefrom and to convert the hydrogel into an alcogel, removing the alcohol from said alcogel by ordinary drying at a temperature below 400° F., and calcining the resulting dry gel at a temperature in the range of about 800 to 1200° F., whereby a silica-zirconia catalyst is obtained which is characterized by the property of having its carbon-burning rate during regeneration increase with extended use.

2. The process of claim 1 wherein the mixture of hydrous silica gel and hydrous zirconia is prepared by reducing the pH of an aqueous water glass solution with an inorganic acid to obtain a silica hydrosol, commingling an aqueous solution of a zirconium salt with the silica hydrosol to obtain a silica-zirconia hydrosol, and converting the silica-zirconia hydrosol to a gel.

3. The method of claim 1 wherein the alcohol is ethanol.

References Cited in the file of this patent

UNITED STATES PATENTS

| | | |
|---|---|---|
| 2,249,767 | Kistler | July 22, 1941 |
| 2,289,918 | Lee et al. | July 14, 1942 |
| 2,330,640 | Teter | Sept. 28, 1943 |
| 2,366,491 | Connolly | Jan. 2, 1945 |
| 2,429,319 | Kearby | Oct. 21, 1947 |
| 2,442,772 | Marisic et al. | June 8, 1948 |
| 2,454,941 | Pierce et al. | Nov. 30, 1948 |